(12) United States Patent
Takahira et al.

(10) Patent No.: US 7,286,616 B2
(45) Date of Patent: Oct. 23, 2007

(54) DATA TRANSMISSION SYSTEM

(75) Inventors: Yutaka Takahira, Neyagawa (JP); Yuji Mizuguchi, Hirakata (JP); Noboru Katta, Itami (JP); Nobuhiko Yasui, Moriguchi (JP); Takahisa Sakai, Amagasaki (JP); Hirotsugu Kawada, Osaka (JP); Toshitomo Umei, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 625 days.

(21) Appl. No.: 10/493,499

(22) PCT Filed: May 30, 2003

(86) PCT No.: PCT/JP03/06806

§ 371 (c)(1),
(2), (4) Date: Apr. 22, 2004

(87) PCT Pub. No.: WO03/103244

PCT Pub. Date: Dec. 11, 2003

(65) Prior Publication Data

US 2005/0030934 A1 Feb. 10, 2005

(30) Foreign Application Priority Data

May 31, 2002 (JP) .............................. 2002-159715

(51) Int. Cl.
*H04L 27/06* (2006.01)
(52) U.S. Cl. ...................................... 375/340; 257/259
(58) Field of Classification Search ................ 375/257, 375/379, 330, 413.02, 340, 276, 283, 259, 375/295, 350; 379/350, 351, 417, 416, 382, 379/353, 413.02, 413.03, 414
See application file for complete search history.

(56) References Cited

U.S. PATENT DOCUMENTS 5,903,613 A * 5/1999 Ishida ........................ 375/340
6,301,308 B1 * 10/2001 Rector ........................ 375/270

FOREIGN PATENT DOCUMENTS

| JP | 2-044937 | | 2/1990 |
|---|---|---|---|
| JP | 02-044937 A | * | 2/1990 |
| JP | 3-203425 | | 9/1991 |
| JP | 4-154237 | | 5/1992 |
| JP | 4-213940 | | 8/1992 |
| JP | 4-280141 | | 10/1992 |

(Continued)

*Primary Examiner*—Mohammed Ghayour
*Assistant Examiner*—Sonia J King
(74) *Attorney, Agent, or Firm*—Wenderoth, Lind & Ponack, L.L.P.

(57) ABSTRACT

A data transmission system in which normal transmission can be performed irrespectively of the inserting orientation of a connector is provided. A transmitting device transmits to a receiving device a differential transmission signal including polarity decision data for deciding the polarity of the connector. Based on the polarity decision data included in the differential transmission signal transmitted from the transmitting device, the receiving device decides whether the polarity of the connector has been reversed or not. When it is decided that the polarity has not been reversed, the receiving device reads data from the differential transmission signal. When it is decided that the polarity has been reversed, the polarity of the differential transmission signal is reversed for data reading.

13 Claims, 15 Drawing Sheets

FOREIGN PATENT DOCUMENTS

| | | |
|---|---|---|
| JP | 5-022303 | 1/1993 |
| JP | 5-199245 | 8/1993 |
| JP | 6-81159 | 10/1994 |
| JP | 7-273807 | 10/1995 |
| JP | 9-266496 | 10/1997 |
| JP | 2770287 | 4/1998 |
| JP | 10-145294 | 5/1998 |
| JP | 2000-232364 | 8/2000 |
| JP | 3161016 | 2/2001 |

\* cited by examiner

FIG. 4
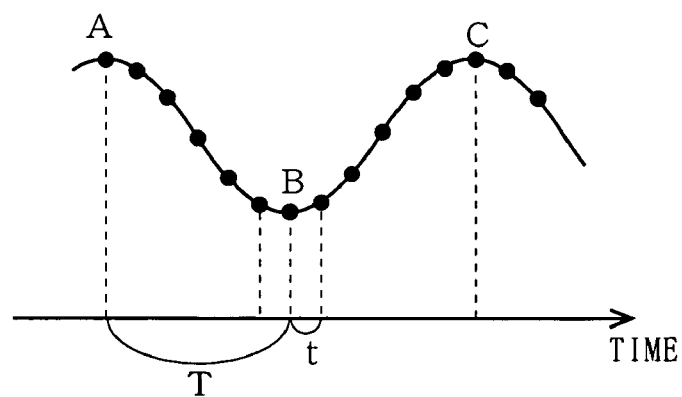
FIG. 5
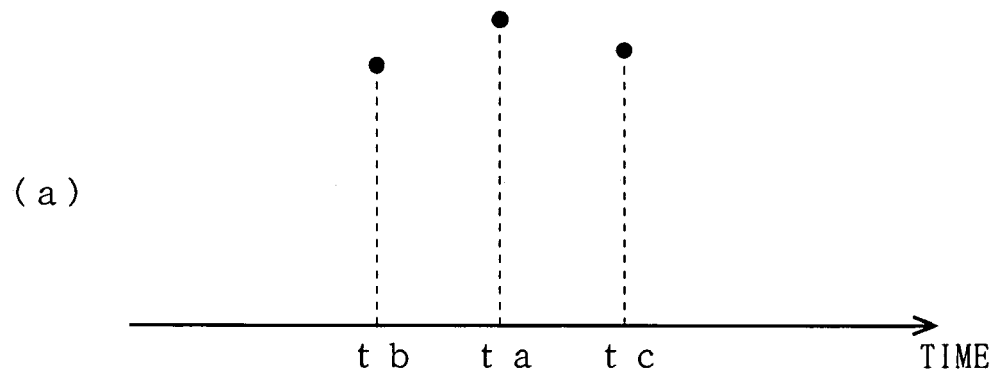
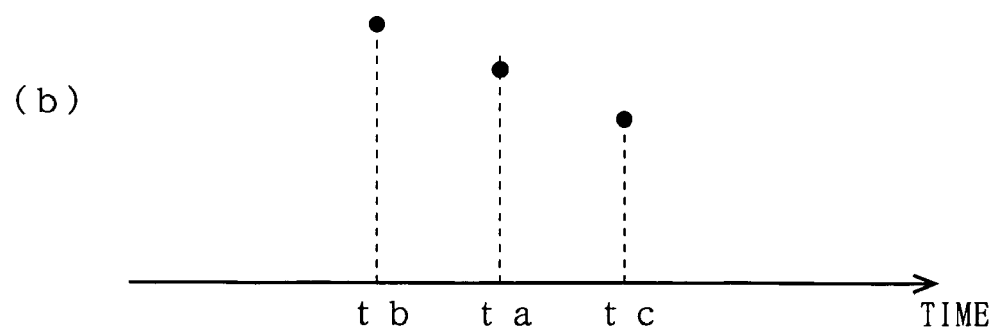

| INPUT VALUE | DECODED DATA |
|---|---|
| 898～1024 | 1 0 |
| 769～897 | 1 1 |
| 642～768 | 0 1 |
| 513～641 | 0 0 |
| 386～512 | 1 0 |
| 257～385 | 1 1 |
| 129～256 | 0 1 |
| 1～128 | 0 0 |

(b)

| INPUT VALUE | DECODED DATA |
|---|---|
| 898～1024 | 0 0 |
| 769～897 | 0 1 |
| 642～768 | 1 1 |
| 513～641 | 1 0 |
| 386～512 | 1 0 |
| 257～385 | 1 1 |
| 129～256 | 0 1 |
| 1～128 | 0 0 |

DATA TRANSMISSION SYSTEM

FIELD OF THE INVENTION

The present invention relates generally to data transmission systems and, more specifically, to a data transmission system for differential transmission by using a transmission signal having a polarity.

BACKGROUND OF THE INVENTION

In conventional encoded data transmission technologies, various types of cables are used for achieving noise-resistant transmission. Of such various cables, coaxial cables capable of preventing noise by shielding a signal line are generally used. However, the coaxial cables have problems of requiring high shielding cost and heavy cable weight.

One technology known to solve the above problems is a differential transmission technology using a twist pair cable. In this technology, with a differential receiver removing in-phase components, it is possible to achieve a high antinoise capability. Furthermore, when a twist pair cable is used, shielding is not required, unlike the case of the coaxial cable. Thus, cost reduction and light-weight design can be advantageously achieved.

The twist pair cable is used for transmission with two lines. Therefore, a signal inherently has a polarity. For this reason, as for a conventional connector used for the twist pair cable, a correct inserting orientation and the polarity of the cable to be connected are predetermined. Therefore, when a user erroneously connects the connector with its inserting orientation (the polarity of the connector) reversed or when a cable of reversed connection is used, a signal with its polarity reversed is received by a device. In this case, data cannot be correctly received.

In one case, a connection is achieved so as not to make a connector with an incorrect polarity of the cable (so as not to make a cable and a connector reversed in polarity between a transmission side and a reception side). In this case, however, the cable and the connector have to be made in consideration of the polarities at the transmission side and the reception side (so that the polarity at the transmission side always coincides with that at the reception side). Therefore, it requires time and cost to manufacture the cable and the connector.

Therefore, an object of the present invention is to provide a data transmission system in which normal transmission can be performed regardless of the polarity of the cable.

SUMMARY OF THE INVENTION

To achieve the object as mentioned above, the present invention has features as described below.

The present invention has the following features to achieve the above object. That is, the present invention is directed to a system in which data is transmitted between a transmitting device and a receiving device by transmitting a differential signal by using two transmission lines having a polarity. The transmitting device generates a differential transmission signal including a polarity decision signal whose signal level is constant for a length including a predetermined number of pieces of symbol data, and sends the differential transmission signal to the transmission lines. On the other hand, the receiving device includes a connector section, a timing correcting section, a polarity deciding section, and a signal processing section. The connector section is removably connected to the two transmission lines for receiving the differential transmission signal transmitted from the transmitting device when being connected to the transmission lines. The timing correcting section corrects a detection timing (e.g., when the detection timing for detecting a signal level is at a symbol position in the differential transmission signal) when a predetermined process performed on the differential transmission signal received by the connector section is successively incorrect for symbol data whose number is larger than the predetermined number. The polarity deciding section detects the polarity decision signal included in the differential transmission signal received by the connector section and, based on a signal level of the polarity decision signal, decides whether a connecting relationship of the connector section with the transmission lines has a positive polarity or a reversed polarity. When it is decided that the connecting relationship of the connector section with the transmission lines has the positive polarity, the signal processing section handles the differential transmission signal received by the connector section as a signal having a normal polarity. In this case, the signal processing section performs the predetermined process. When it is decided that the connecting relationship of the connector section with the transmission lines has the reversed polarity, the signal processing section handles the differential transmission signal as a signal having a reversed polarity and performs the predetermined process. According to the above, based on the polarity decision signal, it is decided whether to handle the differential transmission signal as its polarity has been reversed or as it is. Therefore, even when the connector section is connected reversely in polarity and consequently the polarity of the received differential transmission signal is reversed, the occurrence of reversal is accurately decided, and the reversed differential transmission signal can be reliably corrected. With the above, normal data transmission can be performed irrespectively of the inserting orientation of the connector and the polarity of the connected cable.

Note that, whether the detection timing is correct or incorrect cannot be determined with the polarity decision signal because its signal level is constant. That is, even when symbol data included in the polarity decision signal is tried to be detected, it might not be possible to accurately perform a correcting process and accurately detect a symbol included in a signal to be received thereafter. However, according to the above, the detection timing is corrected when it is successively incorrect for pieces of symbol data whose number is larger than the predetermined number. Thus, correction of the detection timing is not performed as to the polarity decision signal. Therefore, the symbol data included in the differential transmission signal can be reliably detected. That is, it is possible to reliably establish synchronization.

Note that, in the above data transmission system, the differential transmission signal may further include a sync-establishing signal which is transmitted prior to the polarity decision signal and is generated so as to have a signal waveform having a predetermined period. At this time, based on the signal waveform of the sync-establishing signal included in the differential transmission signal received by the connector section, the timing correcting section determines the detection timing for detection of a signal level of a signal received after the sync-establishing signal.

Also, in the above transmission system, the differential transmission signal may further include a transmission data signal which is transmitted after the polarity decision signal and is generated so that a symbol position of data to be transmitted comes at a vertex of a waveform. At this time, the timing correcting section determines whether the detection timing is incorrect or not based on whether a signal detecting position for detection of the signal level in the differential transmission signal in the detection timing is located at the vertex of the signal waveform of the differential transmission signal.

Furthermore, the signal processing section may include a normal processing section and a polarity-reversed processing section. The normal processing section performs a first process on the differential transmission signal received by the connector section when it is decided that the connecting relationship of the connector section with the transmission lines has a positive polarity. The polarity-reversed processing section performs a second process on the differential transmission signal received by the connector section when it is decided that the connecting relationship of the connector section with the transmission lines has a reversed polarity. Also, the normal processing section and the polarity-reversed processing section perform the first and second processes, respectively, so that same process results are deduced for the same differential transmission signal being transmitted on the transmission lines.

According to the above, depending on whether the polarity of the connector or the cable has been reversed or not, either of the processing sections for performing two different processes (the normal processing section and the polarity-reversed processing section) is used. When the connector is connected with a positive polarity, the differential transmission signal is processed by the normal processing section. On the other hand, when the connector is connected with a reversed polarity, the differential transmission is processed by the polarity-reversed processing section so that the same process results can be obtained as those obtained when a signal with its polarity reversed is processed by the normal processing section. With the above, by appropriately using either of the two processing sections, the differential transmission signal can be easily corrected even when the differential transmission signal has been reversed.

Furthermore, the signal processing section may include a polarity reversing section and a normal processing section. The polarity reversing section reverses the polarity of the differential transmission signal received by the connector section when it is decided that the connecting relationship of the connector section with the transmission lines has a reversed polarity. The normal processing section performs, when it is decided that the relationship of the connector section with the transmission lines has a positive polarity, the predetermined process on the differential transmission signal received by the connector section, and performs, when it is decided that the relationship of the connector section with the transmission lines has a reversed polarity, the predetermined process on the differential transmission signal whose polarity has been reversed by the polarity reversing section.

According to the above, the polarity of the received differential transmission signal is reversed only when the polarity of the connector has been reversed. Also, the predetermined process is performed on the differential transmission signal reversed or non-reversed in polarity based on the decision result of whether the polarity has been reversed. Therefore, only one circuit for conversion to decoded data is required. Therefore, the circuit size can be reduced.

Note that, in the above data transmission system, in the differential transmission signal, data of not less than 1 bit may be a signal to each signal level as one symbol.

Note that the present invention can be provided as a signal processing circuit receiving a differential signal transmitted by using two transmission lines having a polarity via a connector removably connected to the transmission lines and performing a predetermined process. The signal processing circuit includes an input terminal, a timing correcting section, a polarity deciding section, and a signal processing section. The input terminal is to input from the connector a differential transmission signal including a polarity decision signal whose signal level is constant for a length including a predetermined number of pieces of symbol data. The timing correcting section corrects a detection timing when the detecting timing for detecting a signal level at a symbol position in the differential transmission signal when the predetermined process is performed on the differential transmission signal input from the input terminal is successively incorrect for symbol data whose number is larger than the predetermined number. The polarity deciding section detects the polarity decision signal included in the differential transmission signal input from the input terminal and, based on a signal level of the polarity decision signal, decides whether a connecting relationship of the connector with the transmission lines has a positive polarity or a reversed polarity. When it is decided that the connecting relationship of the connector with the transmission lines has the positive polarity, the signal processing section handles the differential transmission signal received by the connector as a signal having a normal polarity and performs the predetermined process. However, when it is decided that the connecting relationship of the connector with the transmission lines has the reversed polarity, the signal processing section handles the differential transmission signal as a signal having a reversed polarity and performs the predetermined process.

Furthermore, the present invention may be provided as a data transmission method carried out in the above data transmission system.

BRIEF DESCRIPTION OF THE DRAWINGS

FIG. 4 is an illustration for describing an input/output relationship in an A/D converter illustrated in FIG. 3.

FIG. 5 is an illustration for describing details of the operation of a timing reproducing section in accordance with an embodiment of the present invention.

FIG. 13 is an illustration showing a conversion correspondence in two decoding circuits included in the data deciding section illustrated in FIG. 12.

DETAILED DESCRIPTION OF THE INVENTION

Figure 1:
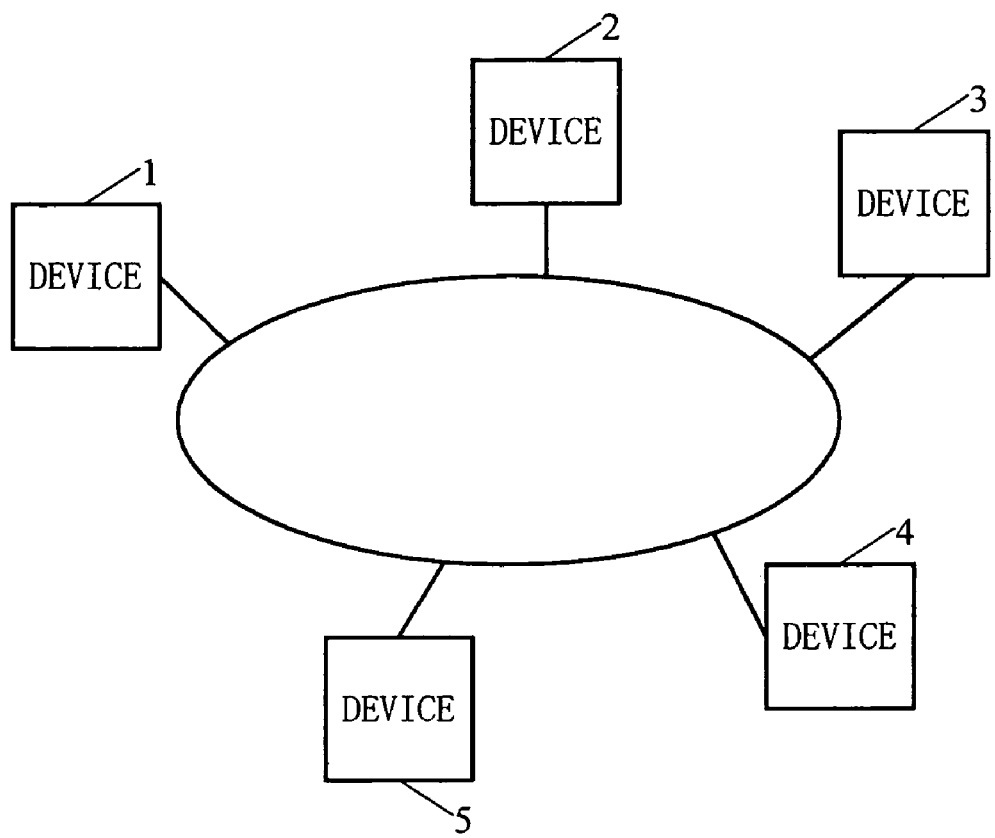
FIG. 1 is a block diagram illustrating the configuration of a data transmission system according to a first embodiment of the present invention.

FIG. 1 is a block diagram illustrating the configuration of a data transmission system according to a first embodiment of the present invention. As illustrated in FIG. 1, the data transmission system constructs a ring-type network with devices 1 through 5. Therefore, in the present embodiment, a device (e.g., 1) receives data from one adjacent device (e.g., 2) and transmits the data to the other adjacent device (e.g., 3), thereby achieving data transmission in a ring shape on the network. Here, the devices (e.g., 1-5) for data transmission are connected via a twist pair cable having a polarity. Also, data transmission among the devices is performed through differential transmission using a differential signal. Note that, in another embodiment, the configuration of the network is not limited to a ring shape, but may take any shape as long as differential transmission is performed among the devices in the system via a transmission line having a polarity.

Figure 2:
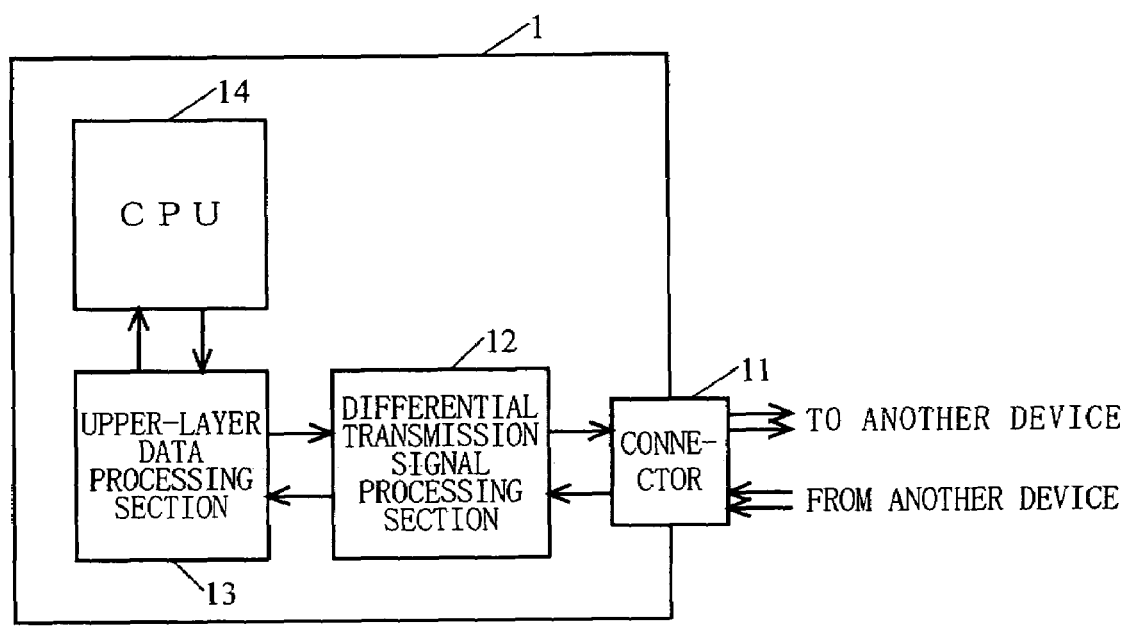
FIG. 2 is a block diagram illustrating a hardware structure of a device 1 illustrated in FIG. 1.

FIG. 2 is a block diagram illustrating a hardware structure of the device 1 illustrated in FIG. 1. Note that, although FIG. 2 illustrates the structure of the device 1, all devices illustrated in FIG. 1 (the devices 1 through 5) have the structure illustrated in FIG. 2. In FIG. 2, the device 1 includes a connector 11, a differential transmission signal processing section 12, an upper-layer data processing section 13, and a CPU 14. The connector 11 is removably connected to another device via a twist pair cable not shown for transmission/reception of a differential transmission signal. Here, the differential transmission signal is a differential signal to be transmitted and received in data transmission among the devices. The differential transmission signal includes transmission data to be transmitted among the devices, and also includes, when power of the network is turned on, and polarity decision data for deciding the polarity of the connector. The polarity decision data is data for deciding the polarity of the connector by deciding the polarity of the differential transmission signal. With the use of the polarity decision data, the data transmission system makes it possible to perform normal data transmission irrespectively of the inserting orientation of the connector. The differential transmission signal will be described in detail further below.

The differential transmission signal processing section 12 decodes the differential transmission signal received via the connector 11 through a predetermined decoding process which will be described further below. Here, the data decoded by the differential transmission signal processing section 12 is referred to as decoded data. Also, the differential transmission signal processing section 12 outputs data input from the upper-layer data processing section 13 as a differential transmission signal. The output differential transmission signal is transmitted via the connector to another device. Also, when power of the network is turned on, the differential transmission signal processing signal 12 adds the polarity decision data to the data input from the upper-layer data processing section 13, and then outputs the resultant signal as a differential transmission signal. The upper-layer data processing section 13 performs predetermined format conversion between data to be processed in the CPU 14 and data to be processed in the differential transmission signal processing section 12.

Figure 3:
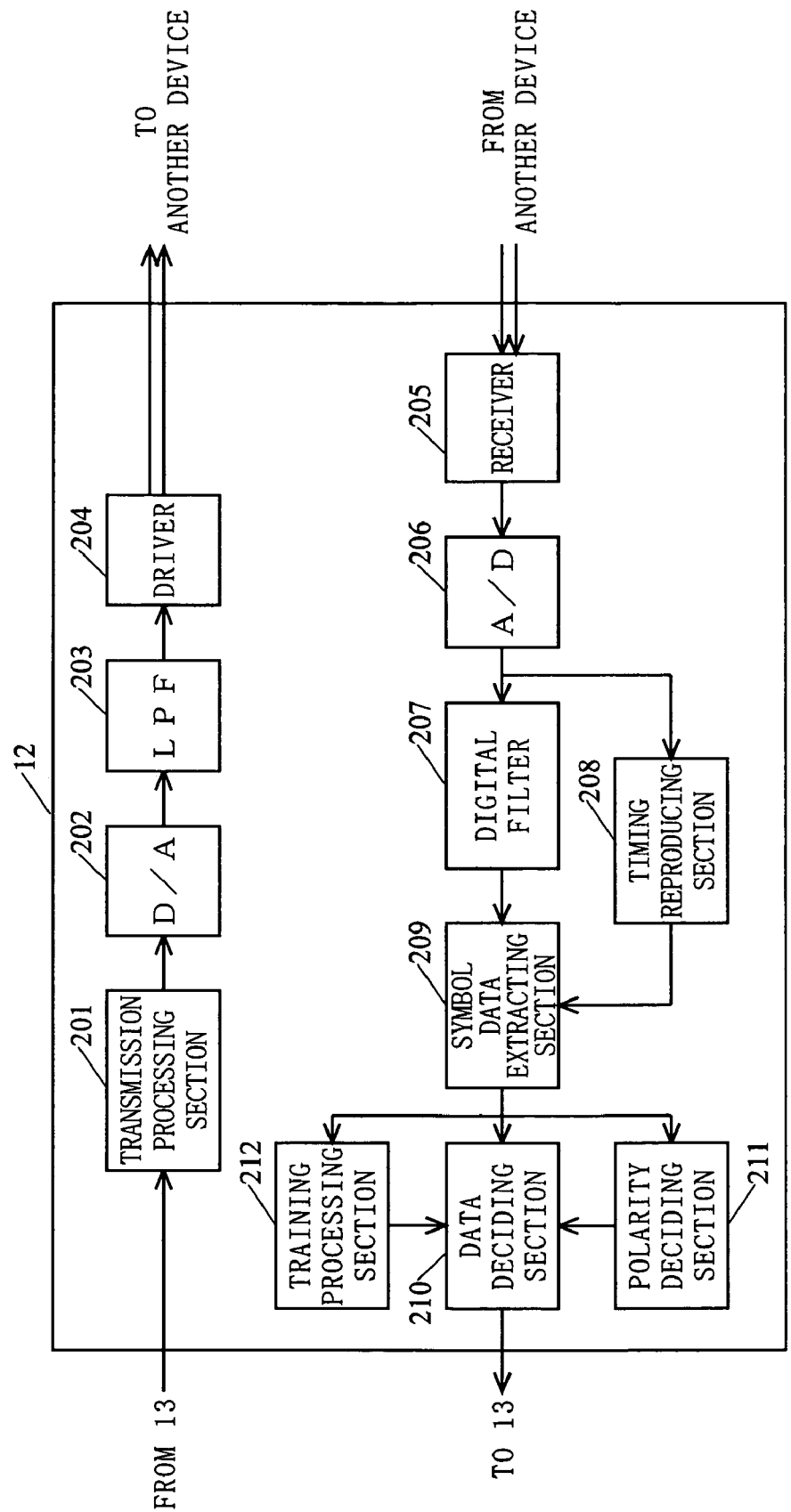
FIG. 3 is a block diagram illustrating a detailed structure of a differential transmission signal processing section 12 illustrated in FIG. 2.

FIG. 3 is a block diagram illustrating a detailed structure of the differential transmission signal processing section 12 illustrated in FIG. 2. The differential transmission signal processing section 12 includes a transmission processing section 201, a D/A converter 202, a low-pass filter (LPF) 203, a driver 204, a receiver 205, an A/D converter (denoted as "A/D" in FIG. 3) 206, a digital filter 207, a timing reproducing section 208, a symbol data extracting section 209, a data deciding section 210, a polarity deciding section 211, and a training processing section 212.

When power of the network is turned on, the transmission processing section 201 outputs initialization data (sync-establishing data, which will be described further below, the above-mentioned polarity decision data, and training data, which will be described further below), and then outputs data input from the upper-layer data processing section 13. The data output from the transmission processing section 201 is D/A-converted by the D/A converter 202, and is then transmitted via the LPF 203 and the driver 204 to another device.

Here, in the present embodiment, it is assumed that 2-bit octal transmission per symbol is performed by using a mapping in which any one of upper quaternary symbols and any one of lower quaternary symbols are alternately selected. That is, it is assumed that the D/A converter 202 converts digital data of 2 bits into analog data. Note that, in the differential transmission signal, data of 2 bits is assigned to each signal level as one symbol. Also, the differential transmission signal is generated so as to include symbol data at every predetermined time interval of T.

In the present embodiment, the differential transmission signal is structured of a sync-establishing signal, a polarity decision signal, a training signal, and a transmission data signal. The sync-establishing signal is a signal including the sync-establishing data in order to make the receiving device identify the polarity decision data and start deciding the polarity of the connector. The polarity decision signal is a signal including the polarity decision data for deciding the polarity of the connector. The training signal is a signal used in a training process, which will be described further below. The transmission data signal is a signal including data to be transmitted.

Also, the polarity decision signal has a predetermined waveform pattern, and is constant in signal level for a length including a predetermined number of pieces of symbol data. In the present embodiment, the polarity decision signal has a pattern in which the same value continues for three symbols (refer to FIG. 9).

Furthermore, in the present embodiment, the differential transmission signal is generated so that, as for portions other than the polarity decision signal, the symbol is located at a peak of the waveform. That is, the waveform of the differential transmission signal (excluding the portion of the polarity decision signal) has a waveform pattern in which the waveform has a peak at every predetermined time interval of T, and the position of the peak is the position of the symbol. As for the differential transmission signal transmitted from another device, each device illustrated in FIG. 1 reads the signal level at the position of the symbol, and then converts the read signal level into digital data, thereby reading the transmission data.

In FIG. 3, the differential transmission signal transmitted from another device is received via the connector 11 by the receiver 205. The differential transmission signal received by the receiver 205 is A/D-converted by the A/D converter 206. The A/D-converted differential transmission signal is supplied to the digital filter 207 and the timing reproducing section 208. Here, the A/D converter 206 converts the input analog data to digital data of plural bits. In the present embodiment, the A/D converter 206 converts the input analog data to digital data of 10 bits.

FIG. 4 is an illustration for describing an input-output relationship in the A/D converter 206 illustrated in FIG. 3. In FIG. 4, a curve represents analog data input to the A/D converter 206. The A/D converter 206 samples the analog data at every predetermined sampling interval of t (t is sufficiently shorter than the above predetermined time interval of T), and converts the magnitude of the signal level to digital data of 10 bits. Note that the digital data of 10 bits does not represent the contents of data included in the differential transmission signal. Note that, in the present embodiment, sampling at every interval of t that is shorter than the above predetermined time interval of T and converting to digital data of 10 bits are performed in order to accurately reproduce multi-valued symbols of the differential transmission signal. In the present embodiment, the waveform of the differential transmission signal is converted to digital data of 10 bits, and then the digital data of 10 bits is further converted to digital data of 2 bits. It is the digital data of 2 bits that represents the contents of the data included in the differential transmission signal.

As described above, the differential transmission signal converted by the A/D converter 206 to the digital data of 10 bits is supplied to the digital filter 207 and the timing reproducing section 208. The digital filter 207 eliminates a high-frequency noise component from the input digital data of 10 bits. The timing reproducing section 208 decides the timing of detecting symbol data in the digital data of 10 bits. The detection timing is the timing of extracting meaningful data (symbol data) from the digital data of 10 bits. The time interval of the detection timing is an interval in which symbol data is included in the differential transmission signal, that is, the above predetermined time interval of T. As for the digital data A/D-converted at every sampling interval of t in the A/D converter 206, not all of the output digital data necessarily represent meaningful symbol data. For this reason, the timing of extracting the symbol data from the digital data output from the A/D converter 206 is decided by the timing reproducing section 208.

Hereinafter, details of the operation of the timing reproducing section 208 are described. FIG. 5 is an illustration for describing details of the operation of the timing reproducing section 208. Points shown in FIG. 5 represent digital data of 10 bits sequentially input from the A/D converter 206 at every time interval of t. The timing reproducing section 208 extracts data in accordance with the detection timing determined at that moment from the data input from the A/D converter 206. The timing reproducing section 208 compares the data extracted in the detection timing (data at a time ta), data input immediately before the detection timing (data at a time tb), and data input immediately after the detection timing (data at a time tc). Here, as illustrated in FIG. 5(a), when the value of the data extracted in the detection timing is the largest (or the smallest), it is determined that the detection timing is correct. On the other hand, as illustrated in FIG. 5(b), when the value of the data extracted in the detection timing is between the data input immediately before the detection timing and the data input immediately after the detection timing, it is determined that the detection timing is incorrect. The above-stated determination is performed at every detection timing.

Furthermore, as for the data input from the A/D converter 206, when the detection timing is incorrect successively for a predetermined number of pieces of symbol data, the timing reproducing section 208 corrects the detection timing. Here, the predetermined number is determined by the number of successive pieces of symbol data whose values are equal to each other in the polarity decision signal. In the present embodiment, the number of successive pieces of symbol data whose values are equal to each other in the polarity decision signal is three. Therefore, the predetermined number can be any as long as it is larger than three.

With this, at the time of reading symbol data included in the polarity decision signal, a case can be prevented where it is determined that the detection timing is incorrect for the predetermined number of successive pieces of symbol data. Here, if it is determined that the detection timing is incorrect, the polarity decision signal is constant in signal level (signal level values at the above times ta, tb, and tc are equal to each other), and therefore correction cannot be made accurately. Therefore, if it is determined that the detection timing is incorrect, the detection timing cannot be made accurately, and therefore the signal thereafter may not be correctly read. For this reason, in the present embodiment, the length of a portion of the polarity decision signal in which the signal level is constant is made shorter than the length of a portion in which the detection timing is determined to be corrected. This ensures reliable and accurate signal reading.

Note that the timing reproducing section 208 corrects the detection timing so that the detection timing becomes a timing of detecting the position of the vertex of the waveform. A specific correcting measure to be taken can be any. For example, in a case where detection results are as illustrated in FIG. 5(b), when a maximum value should be detected in correct detection timing, the time tb is thought to be the closest to the correction detection timing. Therefore, in this case, correction is made so that a time point after the time T has elapsed from the time tb is the next detection timing.

In FIG. 3, the symbol data extracting section 209 extracts data from the digital data input from the digital filter 207 in accordance with the symbol timing determined by the timing reproducing section 208. That is, the timing reproducing section 208 sends an instruction to the symbol data extracting section 209 for extracting data in the determined timing. In response to this instruction, the symbol data extracting section 209 extracts symbol data from the digital data of 10 bits input from the digital filter 207. The extracted symbol data is supplied to the data deciding section 210, the polarity deciding section 211, and the training processing section 212.

The polarity deciding section 211 decides, based on the polarity decision data transmitted prior to the transmission data, whether the polarity of the connector, that is, the connection relationship between the twist pair cable and the connector, has a positive polarity or a reversed polarity. The decision result is supplied to the data deciding section 210.

The training processing section 212 determines, based on the training data transmitted prior to the transmission data, threshold values for converting the signal level of the differential transmission signal to multi-valued (here, octal) digital data. The determined threshold values are supplied to the data deciding section 210. The data deciding section 210 performs a predetermined data deciding process, that is, the above predetermined decoding process, for converting the transmission data included in the differential transmission signal to data that can be processed by the upper-layer data processing section 13. Also, when the polarity is determined at the polarity deciding section 211, the data deciding section 210 changes the decoding result in accordance with the decision result obtained by the polarity deciding section 211. The decoded data, that is, the decoded transmission data, is output to the upper-layer data processing section 13.

Next, the operation in the present data transmission system when power of the network is turned on is described. Note that, in the following, a device transmitting a differential transmission signal is taken as a transmitting device, and a device receiving the differential transmission signal is taken as a receiving device. Here, in the present embodiment, when power of the network is turned on, the polarity of the connector is decided and the polarity of the signal is reversed in accordance with the decision result, thereby performing normal data transmission irrespectively of the inserting orientation of the connector. Note that, since the system according to the present embodiment forms a ring-shaped network, if the connector is removed or inserted or if a new device is added to the network, it is always required to turn off the power of the network. Furthermore, as described above, in the present embodiment, the polarity of the connector is decided when power is turned on. Therefore, in the present data transmission system, a decision can be always made when it is required to decide the connector's polarity (especially when the connector is inserted/removed, etc.).

Figure 6:
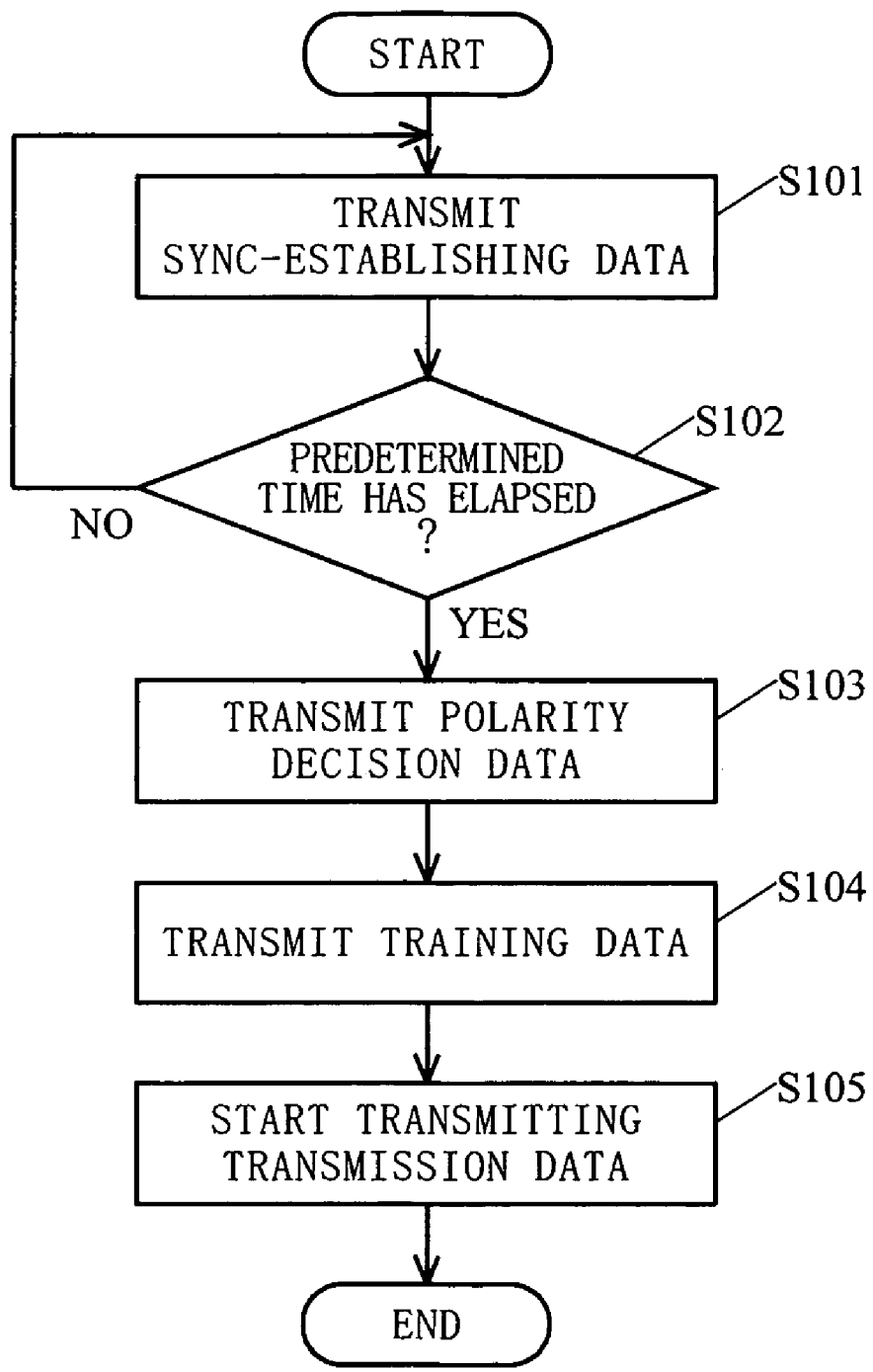
FIG. 6 is a flowchart illustrating a flow of a process performed by a transmitting device in the first embodiment.
Figure 7:
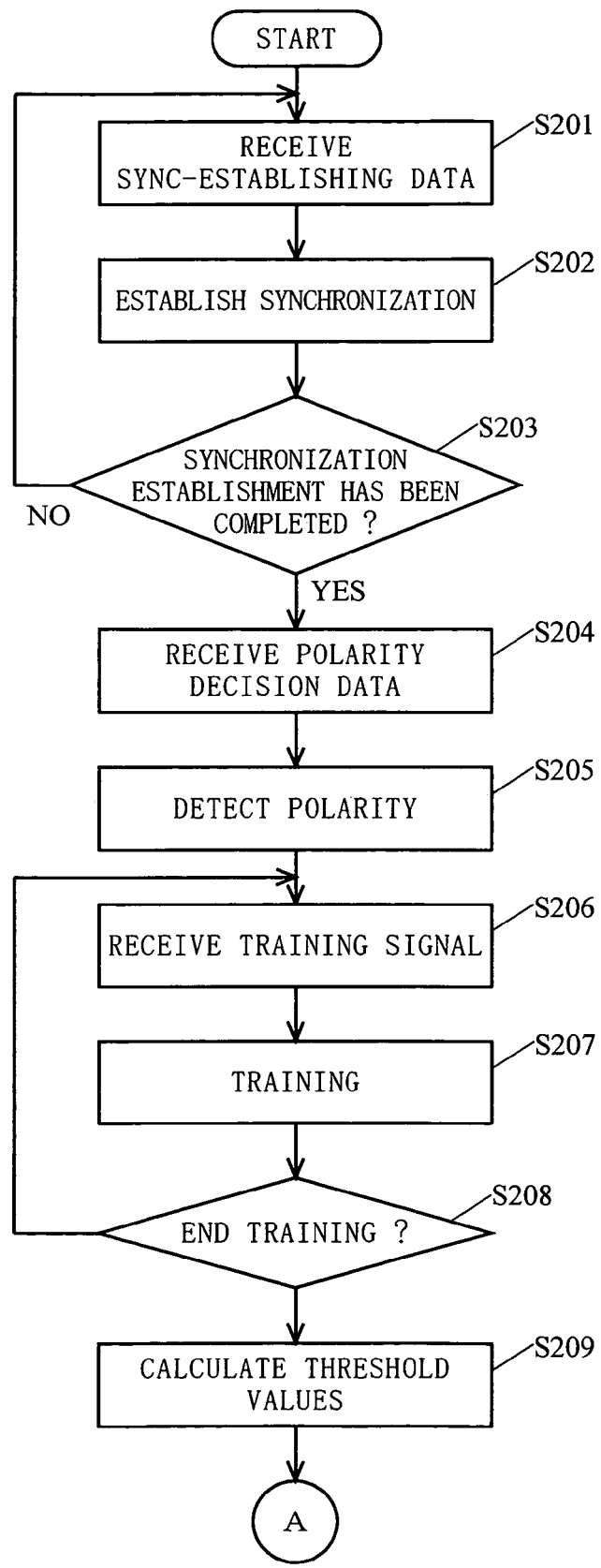
FIG. 7 is a part of a flowchart illustrating a flow of a process performed by a receiving device in the first embodiment.
Figure 8:
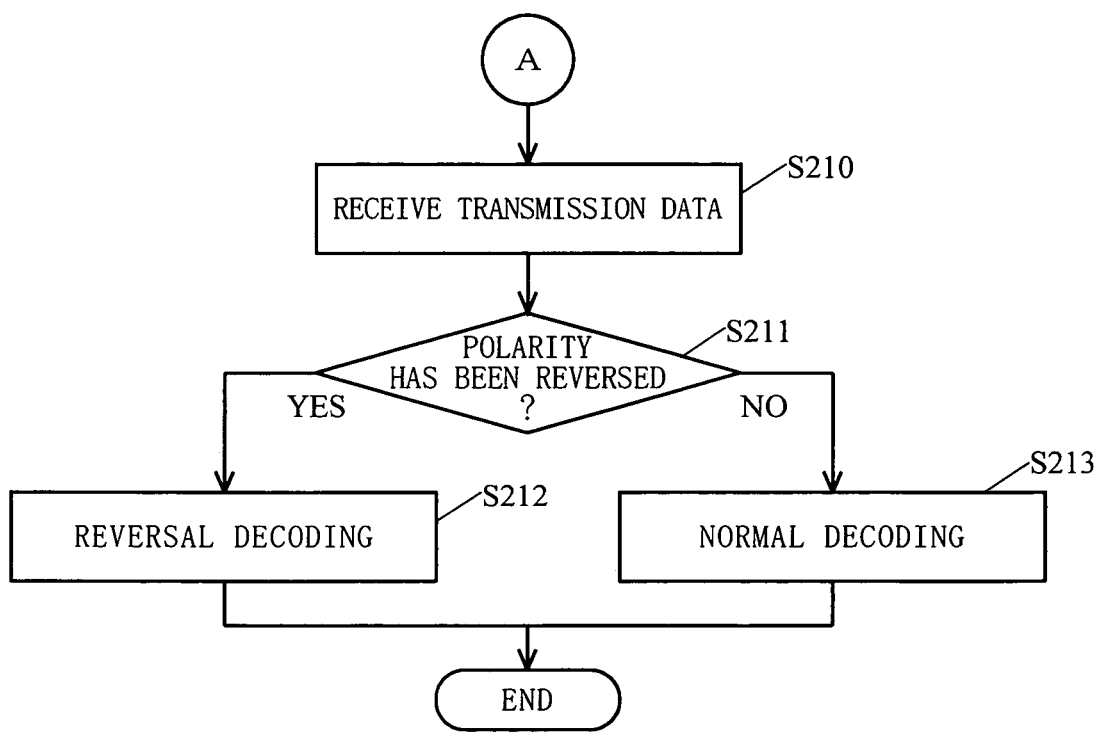
FIG. 8 is a part of the flowchart illustrating the flow of the process performed by the receiving device in the first embodiment.

FIG. 6 is a flowchart illustrating a flow of a process performed by the transmitting device in the present embodiment. Also, FIG. 7 and FIG. 8 are a flowchart illustrating a flow of a process performed by the receiving device in the present embodiment. The operation of each of the devices illustrated in FIG. 6, FIG. 7, and FIG. 8 is started upon turning-on of the power of the network. Here, in the ring-shaped network, data transmission cannot be performed unless power is turned on in the respective devices forming the network. Therefore, in the present embodiment, the state in which power of the network is turned on means that power of all of the devices included in the data transmission system is turned on. Note that a scheme of controlling the turning-on of power of all of the devices forming the network can be any. For example, a device for controlling a power supply of each device forming the network may be placed, and this device turns on power of all of the devices.

When power of the network is turned on, the transmitting device transmits a sync-establishing signal including sync-establishing data (step S101). Here, the sync-establishing data is data for the receiving device to identify the polarity decision data and start a process of deciding the polarity of the connector. Also, in the present embodiment, the sync-establishing data is used as initialization data to be transmitted for starting an initializing process performed in each device. Note that the sync-establishing data has a predetermined given pattern. Specifically, in the process of step S101, the transmission processing section 201 of the transmitting device generates the sync-establishing data when power of the transmitting device is turned on. The generated sync-establishing data is transmitted via the D/A converter 202, the LPF 203, and the driver 204 to the receiving device. In this manner, the process of step S101 is performed.

Next, the transmitting device decides whether or not a predetermined time has elapsed (step S102). Here, the predetermined time is set in advance so as to be equal to or longer than a time required for the receiving device, which is a transmission destination of the sync-establishing data, to complete establishment of synchronization. When it is decided in step S102 that the predetermined time has not elapsed, the transmitting device repeats the process of step S101. On the other hand, when it is decided that the predetermined time has elapsed, the transmitting device transmits a polarity decision signal including polarity decision data, which follows the sync-establishing signal (step S103). Specifically, the transmission processing section 201 of the transmitting device transmits the polarity decision data having the predetermined given pattern in a manner similar to that of the above sync-establishing data. The length of the polarity decision data is predetermined.

After transmitting the polarity decision signal by the predetermined length, the transmitting device transmits a training signal, which follows the polarity decision signal (step S104). The training signal is used for setting threshold values for deciding multi-valued (here, octal) digital data from the signal level of the differential transmission signal. The pattern and length of the training signal are predetermined. Note that the scheme of transmitting the training signal is similar to that of the above sync-establishing data.

Next, the transmitting device transmits a transmission data signal including transmission data, which follows the training signal (step S105). Specifically, after transmitting the training signal having the given pattern, the transmission processing section 201 of the transmitting device transmits the transmission data input from the upper-layer data processing section 13 as a differential transmission signal. The transmission scheme is similar to that of the above sync-establishing data. With the transmission of the transmission data to be transmitted being completed, the transmission processing section 201 of the transmitting device ends the process illustrated in FIG. 6. As such, through the process illustrated in FIG. 6, the differential transmission signal structured of, in order of transmission, the sync-establishing signal, the polarity decision signal, the training signal, and the transmission data signal, is transmitted to the receiving device.

Next, the process performed by the receiving device illustrated in FIG. 7 is described. In the receiving device, the sync-establishing signal is first received from the transmitting device as the differential transmission signal. Therefore, when power of the network is turned on, the receiving device first receives the sync-establishing signal (step S201). The sync-establishing signal is supplied via the receiver 205 to the A/D converter 206. The input sync-establishing signal is A/D-converted by the A/D converter 206, and the A/D-converted digital data is then supplied to the digital filter 207 and the timing reproducing section 208.

Next, based on the sync-establishing signal received in step S201, the receiving device establishes synchronization (step S202). The process of establishing synchronization is performed by the timing reproducing section 208. That is, the timing reproducing section 208 determines the timing of detecting the level of the signal transmitted after the sync-establishing signal (detection timing). Determination of the detection timing is made by performing a process of correcting the above-described detection timing to make the detection timing corrected. The timing reproducing section 208 indicates the detection timing determined in step S202 to the symbol data extracting section 209.

Next, the receiving device decides whether the process of establishing synchronization has been completed (step S203). This process is performed by the timing reproducing section 208, and is designed so that the decision in step S203 has been completed before the predetermined time in the above step S102 has elapsed. When it is determined that the process of establishing synchronization has not been completed, the receiving device again performs the process of step S201.

On the other hand, when it is determined in step S203 that the process of establishing synchronization has been completed, the receiving device receives the polarity decision signal transmitted in step S103 from the transmitting device (step S204). The polarity decision signal is supplied via the receiver 205 of the receiving device to the A/D converter 206. The input polarity decision signal is A/D-converted by the A/D converter 206. Furthermore, from the digital data of the A/D-converted polarity decision signal, the symbol data is extracted by the symbol data extracting section 209.

Next after step S204, the receiving device detects the polarity of the connector (step S205). This process is performed by the polarity deciding section 211. Specifically, the polarity deciding section 211 of the receiving device receives the polarity decision signal output from the symbol data extracting section 209 and, based on the received polarity decision signal, detects whether or not the polarity of the differential transmission signal (polarity decision signal) has been reversed. As such, depending on whether or not the polarity of the differential transmission signal has been reversed, it can be decided whether or not the polarity of the connector has been reversed. Here, it is assumed in the present embodiment that, when the value of the polarity decision data is at a maximum level of the differential transmission signal, that is, when the value of the polarity decision data is 1024, it is decided that the polarity of the differential transmission has not been reversed.

Figure 9:
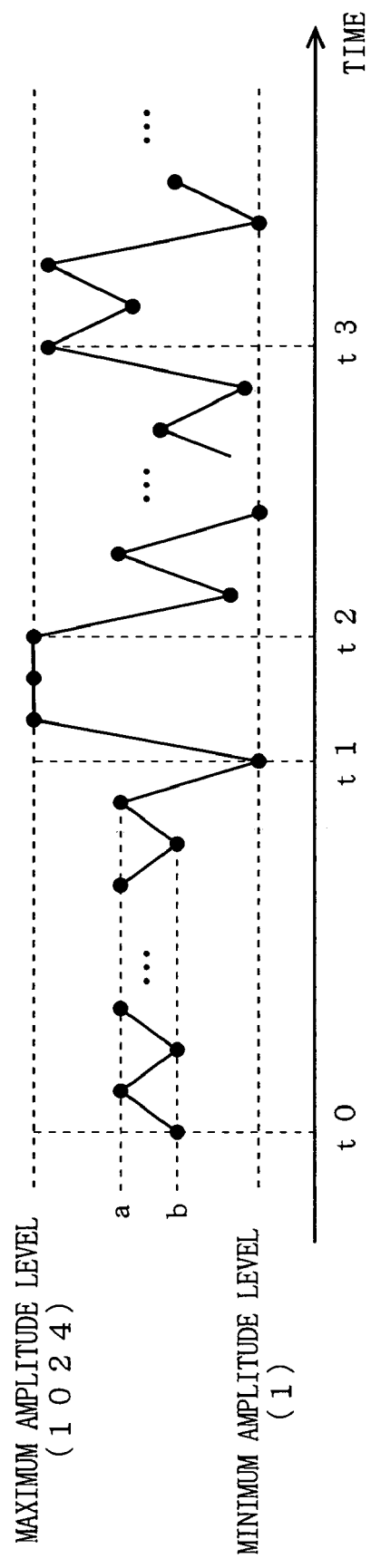
FIG. 9 is an illustration schematically showing values indicated by data output from a symbol data extracting section illustrated in FIG. 3.

Details of a polarity deciding scheme are described below. FIG. 9 is an illustration schematically showing values indicated by data output from the symbol data extracting section 209 illustrated in FIG. 3. In FIG. 9, the vertical axis represents the magnitude of digital values, which are output values of the symbol data extracting section 209, and the horizontal axis represents time for output. Furthermore, a digital value output from the symbol data extracting section 209 is a value of 10 bits, and its magnitude represents the level of the differential transmission signal. That is, the output value of the symbol data extracting section 209 can be any one from 1 to 1024, numerically representing the level of the differential transmission signal. Furthermore, an interval between points on a line illustrated in FIG. 9 is equal to the above-described time interval of T. The line represents the waveform of the differential transmission signal by using discrete numerical values.

Here, the state from times t0 to t1 is such that the above sync-establishing data is being output. That is, the pattern in which output values a and b are alternately output from the times t0 to t1 is a pattern indicating the sync-establishing data. Such a pattern is set in advance. Note that, from the times t0 to t1, the processes of steps S201 through S203 are performed.

Next, the state from times t1 to t2 is such that the polarity decision data included in the polarity decision signal is being output. That is, the pattern in which output values of 1024 are successively output from the times t1 to t2 is a pattern of the polarity decision data. As with the sync-establishing data, the pattern of the polarity decision data is predetermined. Here, the polarity decision data has a pattern in which the same values are successively observed for three symbols. Note that, from the times t1 to t2, the processes of steps S204 and S205 are performed. As such, in the present embodiment, the polarity of the connector can be decided by using the amplitude level of the differential transmission signal after the pattern of the sync-establishing data.

Figure 10:
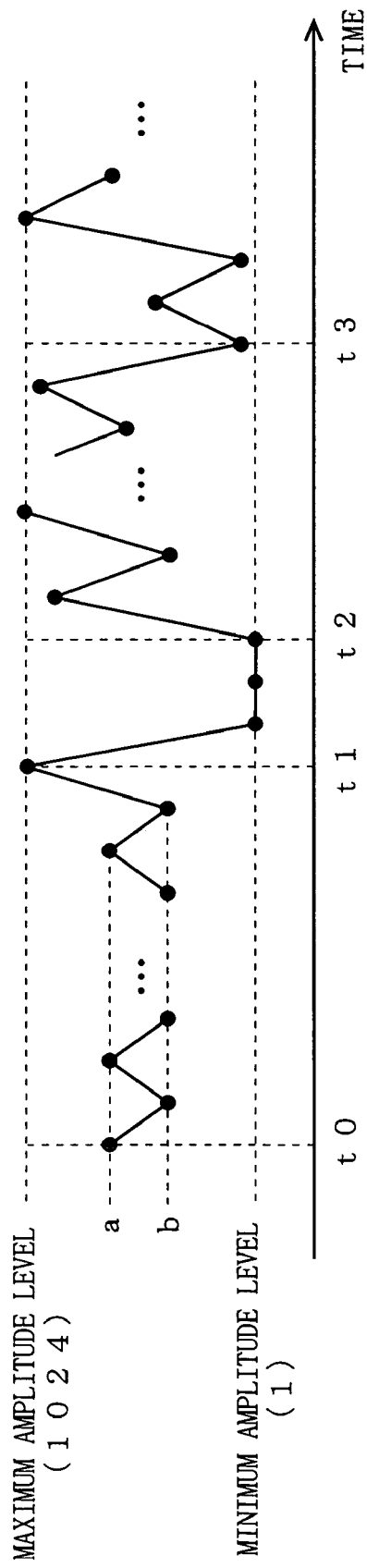
FIG. 10 is an illustration schematically showing values indicated by data output from the symbol data extracting section illustrated in FIG. 3 when the polarity of a differential transmission signal has been reversed.

FIG. 10 is an illustration schematically showing values indicated by data output from the symbol data extracting section 209 illustrated in FIG. 3 in a case where the polarity of the differential transmission signal has been reversed. FIG. 10 shows the output values of the symbol data extracting section 209 when data similar to that illustrated in FIG. 9 is received and when the connecting orientation of the connector is reversed from that illustrated in FIG. 9. As such, in a case where the polarity of the connector has been reversed, the differential transmission signal received by the receiving device is a reversed signal compared with a case where the polarity of the connector is positive. That is, the differential transmission signal received by the receiving device has a polarity, and this polarity is varied depending on the polarity of the connector. As illustrated in FIG. 10, if the orientation of the connector has been reversed, the value to be read as the polarity decision data is 1. Therefore, in this case, it is decided that the polarity of the differential transmission signal has been reversed. As such, whether or not the polarity of the differential transmission signal has been reversed can be decided with the value of the polarity decision data. Thus, with the value of the polarity decision data, the polarity deciding section 211 decides whether or not the polarity of the differential transmission signal has been reversed, that is, whether or not the connecting orientation of the connector has been reversed. Furthermore, the polarity deciding section 211 outputs to the data deciding section 210 a signal polarity flag indicative of whether or not the polarity has been reversed.

Returning to the description of FIG. 7, next after step S205, the receiving device receives the training signal transmitted in step S104 from the transmitting device (step S206). Note that the processes performed on the training signal by the receiver 205 through the symbol data extracting section 209 are similar to those performed on the polarity decision signal. Next, the receiving device uses the training signal received in step S206 to perform a training process (step S207). This process is performed by the training processing section 212. Details of the training process are described below.

In FIG. 9, the state from times t2 to t3 is such that the training signal is being output. The training signal has a predetermined pattern. This pattern is determined so that the value of octal digital data takes all values (eight values) in a predetermined order. The training processing section 212 stores the order of the octal digital values indicated by the pattern. In step S207, the training processing section 212 stores the value of the digital data of 10 bits input from the symbol data extracting section 209 in relation to the stored octal digital values.

Returning to the description of FIG. 7, next after step S207, the training processing section 212 decides whether or not training has been completed. Since the length of the training signal is predetermined, the number of times of performing the process of step S207 is also predetermined. If the process of step S207 has been performed for the predetermined number of times, the training processing section 212 decides that training has been completed. When it is decided that training has not yet been completed, the process of step S206 is performed.

On the other hand, when it is decided that training has been completed, the training processing section 212 calculates threshold values (step S209). The threshold values are values for converting the signal levels of the differential transmission signal to octal digital data.

Figure 11:
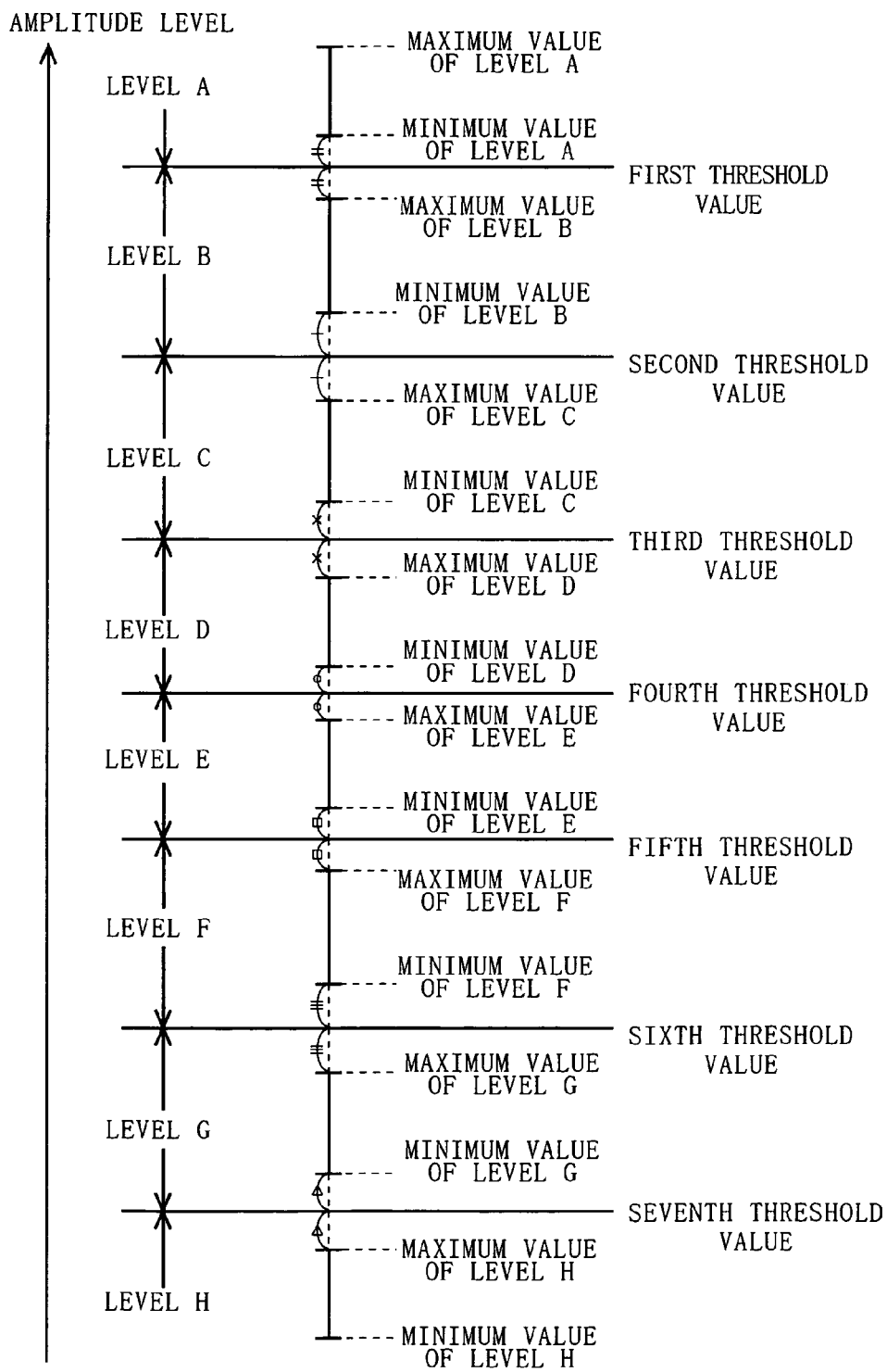
FIG. 11 is an illustration for describing a scheme of calculating threshold values in accordance with an embodiment of the present invention.

FIG. 11 is an illustration for describing one example of a scheme of calculating threshold values. In FIG. 11, the range of values (1 through 1024) the signal level can take is divided into eight levels from Level A to Level H according to the magnitude of the signal level. Level A through D correspond to values of four types an octal digital value can take ("00", "01", "10", and "11"), respectively. Similarly, Level E through H correspond to values of four types a quaternary digital value can take ("00", "01", "10", and "11"), respectively. The training processing section 212 sets the threshold values based on the value of the digital data of 10 bits input in step S207 from the symbol data extracting section 209 and the octal digital values stored in advance. Specifically, a first threshold value for distinguishing between Level A and Level B is set in the following manner. That is, as the first threshold value, the training processing section 212 takes an average value (median value) between a minimum value of digital data of 10 bits input as having a value indicative of Level A and a maximum value of digital data of 10 bits input as having a value indicative of Level B. Second through seventh threshold values for distinguishing other levels are set in a similar manner as that of the above first threshold value. The first through seventh threshold values set in the above-described manner are supplied to the data deciding section 210.

In FIG. 8, next after step S209, the receiving device receives the transmission data signal (step S210). Note that, in FIG. 9, the state after the time t3 is such that the transmission data signal is being output. The data after the time t3 is decoded by the data deciding section 210. Furthermore, the processes performed on the transmission data signal by the receiver 205 through the symbol data extracting section 209 are similar to those performed on the polarity decision signal.

Next, the receiving device decides whether or not the polarity of the differential transmission signal (transmission data signal) has been reversed (step S211). This process is performed by the data deciding section 210. Specifically, the data deciding section 210 decides whether or not the polarity of the differential transmission signal has been reversed based on the signal polarity flag input from the polarity deciding section 211. When it is decided in step S211 that the polarity of the differential transmission signal has been reversed, the receiving device performs a decoding process for a case where the polarity has been reversed (step S212). On the other hand, when it is decided that the polarity of the differential transmission signal has not been reversed, the receiving device performs a normal decoding process (step S213). Here, the processes of step S212 and step S213 are preformed by the data deciding section 210 of the receiving device. Details of the operation performed by the data deciding section 210 are described below.

Figure 12:
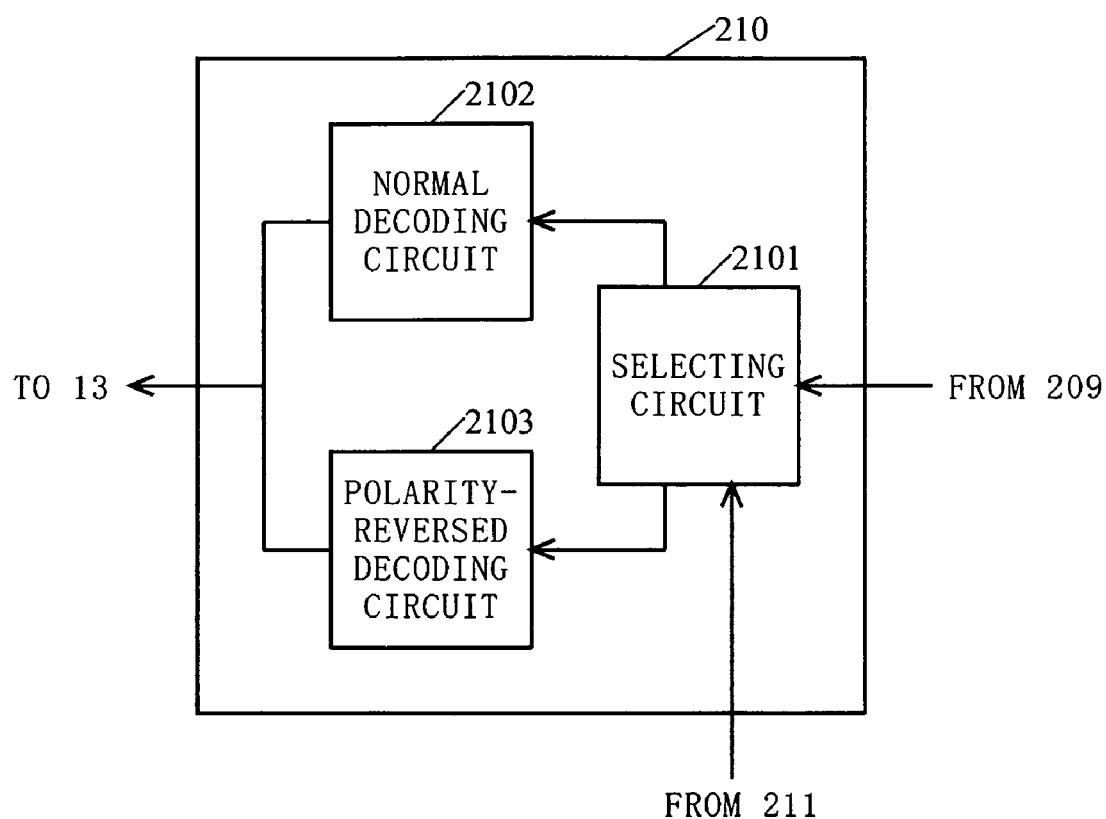
FIG. 12 is a block diagram illustrating a detailed structure of a data deciding section illustrated in FIG. 3.

FIG. 12 is a block diagram illustrating a detailed structure of the data deciding section 210 illustrated in FIG. 3. In FIG. 12, the data deciding section 210 includes a selecting circuit 2101, a normal decoding circuit 2102, and a polarity-reversed decoding circuit 2103. In step S206, in accordance with the indication of the signal polarity flag input from the polarity deciding section 211, the selecting circuit 2101 selects one of the normal decoding circuit 2102 and the polarity-reversed decoding circuit 2103 to which the output signal from the A/D converter 206 is to be supplied. Upon reception of a signal polarity flag indicating that the polarity of the differential transmission signal has been reversed, the selecting circuit 2101 outputs the output signal from the A/D converter 206 to the polarity-reversed decoding circuit 2103. In step S207, the polarity-reversed decoding circuit 2103 receives the output signal from the A/D converter 206, and then decodes the transmission data, which is the received output signal. On the other hand, upon reception of a signal polarity flag indicating that the polarity of the differential transmission signal has not been reversed, the selecting circuit 2101 outputs the output signal from the A/D converter 206 to the normal decoding circuit 2102. In step S208, the normal decoding circuit 2102 receives the output signal from the A/D converter 206, and then decodes the transmission data, which is the received output signal.

FIG. 13 is an illustration showing a conversion correspondence in the two decoding circuits included in the data deciding section 210 illustrated in FIG. 12. FIG. 13(a) is a table indicative of a correspondence in the normal decoding circuit 2102, and FIG. 13(b) is a table indicative of a correspondence in the polarity-reversed decoding circuit 2103. Here, it is assumed in the present embodiment that each decoding circuit converts the digital data of 10 bits output from the A/D converter 206 to digital data of 2 bits. Therefore, in each conversion table illustrated in FIG. 13, the digital values of 10 bits output from the A/D converter 206 (values each indicative of a level of the differential transmission signal) are divided into eight levels, and are respectively related to numerical values of 2 bits indicative of decoded data. Note that the threshold values of eight levels shown in FIG. 13 are the above-described first through seventh threshold values. Here, the two conversion tables shown in FIG. 13 are generated so that the digital values of 10 bits corresponding to the decoded data to be converted appear on these two conversion tables with the polarity in reverse to each other. That is, the normal decoding circuit 2102 and the polarity-reversed decoding circuit 2103 are designed so that the polarity of the differential transmission signal corresponding to the decoded data to be output is in reverse to each other. With these two decoding circuits being designed in the above manner, the decoded data obtained through decoding by using the normal decoding circuit when the polarity of the signal has not been reversed can be equal to the decoded data obtained through decoding by using the polarity-reversed decoding circuit when the polarity of the signal has been reversed.

Upon completion of the above-described process of step S212 or S213, the receiving device ends the processing. Note that the decoded data obtained through decoding in step S212 or S213 is forwarded via the upper-layer data processing section 13 to the CPU 14.

Note in the above first embodiment that the above sync-establishing data is set in advance so that the waveform of the differential transmission signal added with the synch-establishing data includes a waveform pattern in which the waveform is the same irrespectively of whether the polarity of the connector is positive or reversed. That is, as illustrated in FIG. 9, the synch-establishing data includes the pattern in which a and b are alternately output as the output value. Such a pattern is the same when the connector is connected so as to have a positive polarity and when the connector is connected so as to have a reversed polarity. Therefore, by detecting the sync-establishing data based on such a pattern, the receiving device can reliably detect the sync-establishing data.

Next, a second embodiment is described. Note that the first embodiment and the second embodiment are different in the structure of the data deciding section 210 and the decoding process performed by the data deciding section 210. Therefore, only these differences are described below, and processes similar to those in the first embodiment are not described herein.

Figure 14:
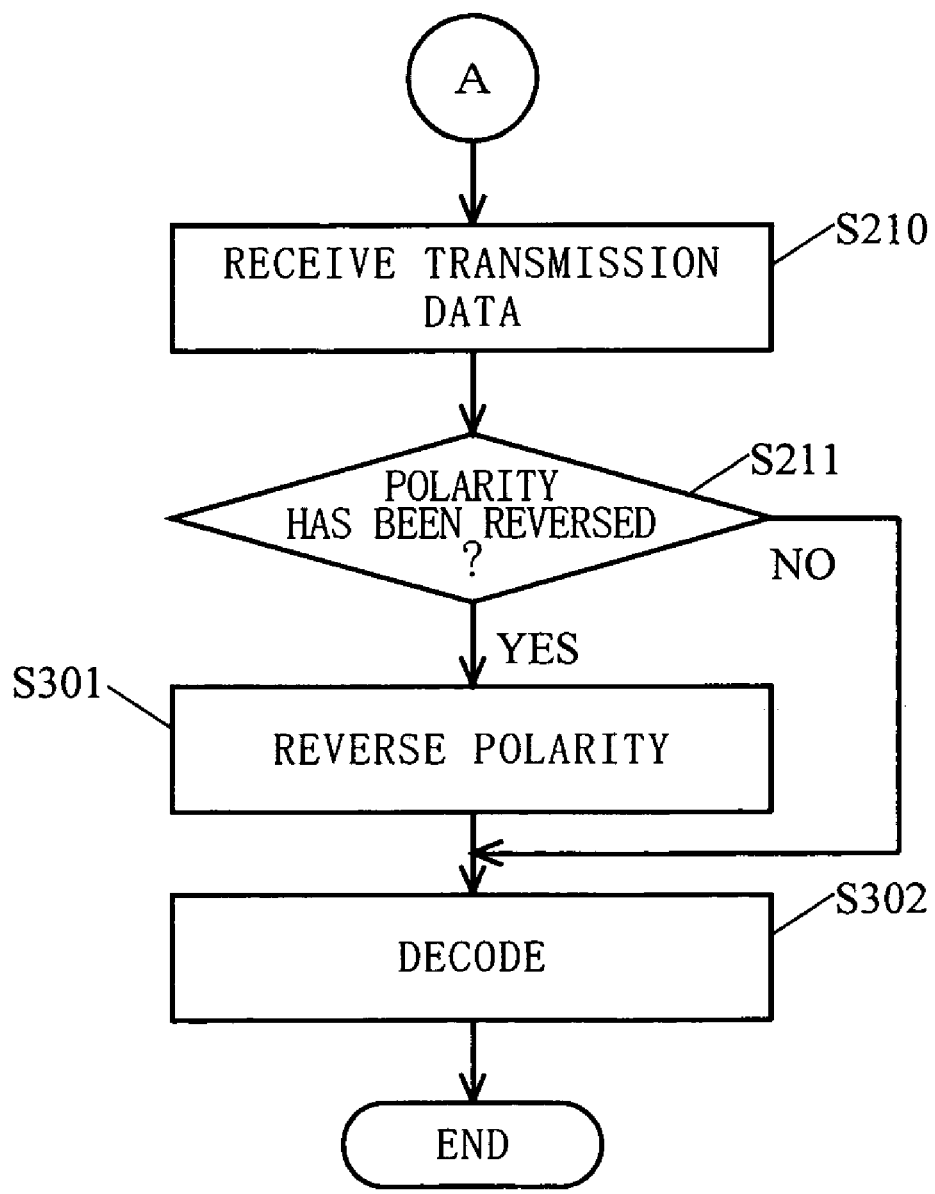
FIG. 14 is a flowchart illustrating a flow of a process performed by a receiving device in a second embodiment of the present invention.

FIG. 14 is a flowchart showing a flow of a process performed by the receiving device in the second embodiment. Here, the present embodiment is different from the first embodiment in the processes of steps S301 and S302. Therefore, the processes of steps S201 through S211 are not described herein. In step S211, upon decision that the polarity of the differential transmission signal has been reversed, the receiving device reverses the polarity of the differential transmission signal (step S301), and then performs the process of step S302. On the other hand, upon decision that the polarity of the differential transmission signal has not been reversed, the receiving device does not perform the process of step S301 but performs the process of step S302. Details of the operation performed by the data deciding section 210 are described below.

Figure 15:
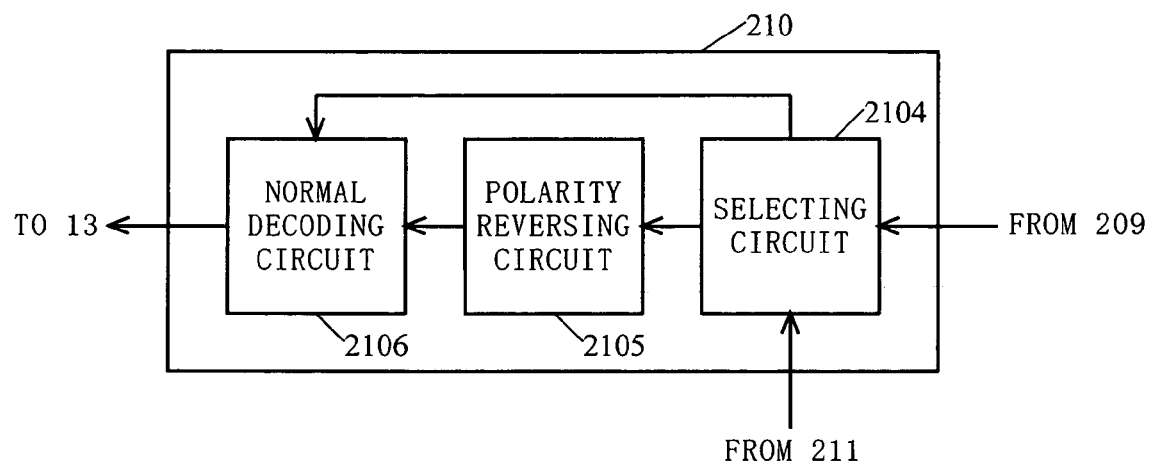
FIG. 15 is a block diagram illustrating a detailed structure of a data deciding section in the second embodiment.

FIG. 15 is a block diagram illustrating a detailed structure of the data deciding section 210 in the second embodiment. In FIG. 15, the data deciding section 210 includes a selecting circuit 2104, a polarity reversing circuit 2105, and a normal decoding circuit 2106. In step S211, in accordance with the indication of the signal polarity flag input from the polarity deciding section 211, the selecting circuit 2104 selects either one of the polarity reversing circuit 2105 and the normal decoding circuit 2106 to which the output signal from the A/D converter 206 is to be supplied. Upon reception of a signal polarity flag indicating that the polarity of the differential transmission signal has been reversed, the selecting circuit 2104 outputs the output signal from the A/D converter 206 to the polarity reversing circuit 2105. The polarity reversing circuit 2105 reverses the polarity of the differential transmission signal indicating the input transmission data (step S301).

Figure 16:
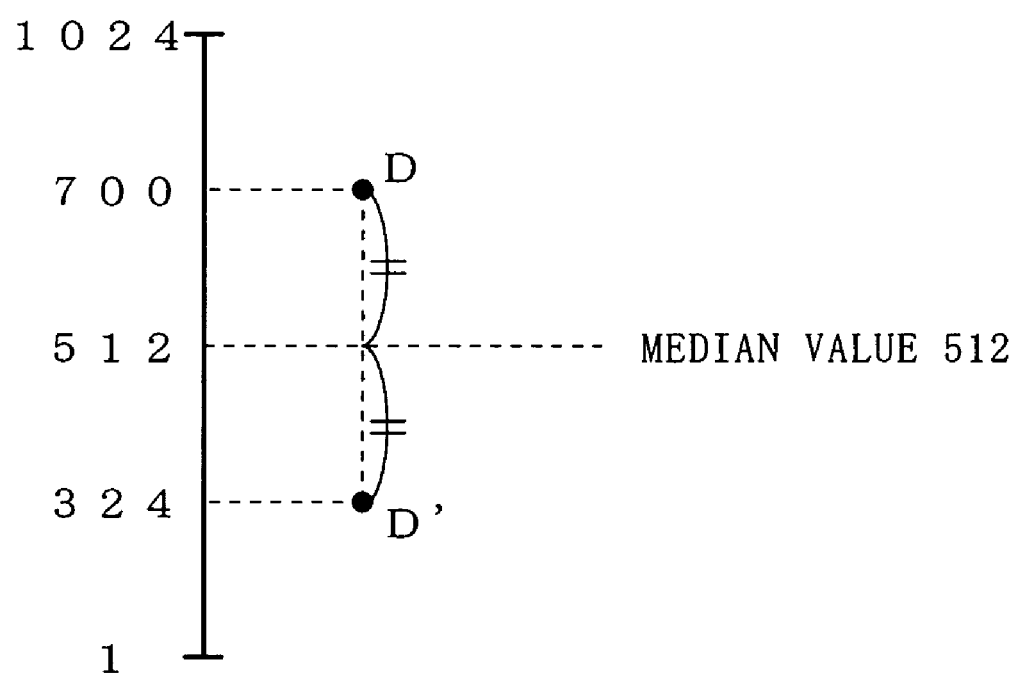
FIG. 16 is an illustration schematically showing a polarity reversing process in a polarity reversing circuit illustrated in FIG. 15.

FIG. 16 is an illustration schematically showing a polarity reversing process in the polarity reversing circuit 2105 illustrated in FIG. 15. The polarity reversing circuit 2105 converts the input value so that the input value has a line-symmetric relationship with the median value (512) of the values (1 from 1024) that can be taken as that input value. For example, as illustrated in FIG. 16, when the input value from the A/D converter to the polarity reversing circuit 2105 is 700 (point D), the polarity reversing circuit 2105 converts the input value to 324 (point D') for output to the normal decoding circuit 2106. With this converting process, the polarity reversing circuit 2105 can reverse the polarity of the differential transmission signal.

On the other hand, upon reception of a signal polarity flag indicating that the polarity of the differential transmission signal has not been reversed, the selecting circuit 2104 outputs the output signal from the A/D converter 206 to the normal decoding circuit 2106. The normal decoding circuit 2106 receives an output from the A/D converter 206 or the polarity reversing circuit 2105, and decodes the received transmission data (step S302). The normal decoding circuit 2106 performs a process similar to that performed by the normal decoding circuit 2102 in the first embodiment. With this, the digital data of 10 bits generated in the A/D converter 206 is converted to digital data of 2 bits (decoded data).

Upon completion of the above-described process of step S302, the receiving device ends the processing. Note that the decoded data decoded in step S302 is forwarded via the upper-layer data processing section 13 to the CPU 14.

As described above, in the above first and second embodiments, the polarity of the connector is decided by using the polarity decision data and, based on the decision result, the polarity of the differential transmission signal is reversed or non-reversed, thereby performing correct data transmission irrespectively of the polarity of the connector.

Note that, in the above first and second embodiments, description has been made to a case as an example in which a decoding process is performed on the differential transmission signal received by the receiving device. Here, in another embodiment, a process performed on the differential transmission signal is not limited to the above. The process performed on the differential transmission signal may be any as long as it changes a manner of handling the differential transmission signal received by the connector 11 to a manner in which the signal is handled as a signal with a normal polarity or to a manner in which the signal is handled as a signal with a reversed polarity, depending on a case where it is decided that the connecting relationship of the connector 11 with the twist pair cable has a positive polarity or a case where it is decided that the connecting relationship has a reversed polarity.

Also, in the above first and second embodiments, the polarity of the connector is decided by using the polarity decision data when power is turned on. Therefore, the decision result has to be stored when the polarity of the connector is decided at the time of turning on the power. Although not shown in the above embodiments, the present data transmission system is provided with a storage section for storing the polarity of the connector decided at the time of turning on the power. Note that, in another embodiment, the polarity decision data may be always added prior to the transmission data, and the polarity of the connector may be decided every time the transmission data is transmitted. Furthermore, the polarity decision data may be always added, and the receiving device may decide the polarity of the connector only when required. For example, if the receiving device has a function of detecting removal/insertion of the connector, the polarity of the connector may be decided every time removal/insertion of the connector is detected.

Furthermore, the above first and second embodiments are embodiments in which the differential transmission signal is A/D converted and is then reversed. Here, in another embodiment, the differential transmission signal may be reversed by using an analog circuit before being A/D-converted.

Furthermore, other than the above first and second embodiments, the polarity may be reversed after the decoded data is generated. Specifically, a converting circuit may be provided for converting the digital data of 2 bits generated as the decoded data, and the digital value may be converted by the converting circuit in accordance with the signal polarity flag. In this case, the converting circuit is designed so that the decoded data is converted to decoded data generated in a case where the polarity of the differential transmission signal has been reversed.

Furthermore, in the above first and second embodiments, the pattern in which a and b are alternately output as an output value is included, thereby enabling the receiving device to reliably detect the sync-establishing data. On the other hand, in another embodiment, the sync-establishing data may be any as long as it has a predetermined pattern. Also, in this case, the receiving device preferably stores the predetermined pattern and a pattern for a case where the polarity of the differential transmission signal including this pattern has been reversed. And the receiving device detects a differential transmission signal corresponding to either of the two patterns stored in advance to start deciding the polarity. Also with this scheme, the receiving device can reliably detect the synch-establishing data.

Furthermore, in the above first and second embodiments, a signal level value in each symbol is read, and the value is then converted to a digital value of 2 bits. Here, a scheme of conversion to a digital value of 2 bits is not limited to the above. For example, a difference between one symbol and the previous symbol may be read and then be converted to a digital value of 2 bits. In this case, the data deciding section performs a data deciding process (conversion to digital data of 2 bits) by using a differential value between a value of the input signal level (which corresponds to the digital data of 10 bits in the above embodiments) and a level value of a signal input in the previous timing.

As described above, the data transmission system of the present invention can be used for the purpose of performing normal transmission irrespectively of the inserting orientation of the connector.

The invention claimed is:

1. A system in which data is transmitted between a transmitting device and a receiving device by transmitting a differential signal by using two transmission lines having a polarity, the transmitting device being operable to generate a differential transmission signal including a polarity decision signal whose signal level is constant for a length including a predetermined number of pieces of symbol data and sending the differential transmission signal to the transmission lines, the receiving device including:

a connector section removably connected to the two transmission lines for receiving the differential transmission signal transmitted from the transmitting device when being connected to the transmission lines;

a timing correcting section operable to correct a detection timing when the detection timing for detecting a signal level at a symbol position in the differential transmission signal, is successively incorrect for a plurality of symbol data whose number is larger than the number of pieces of symbol data representing the polarity decision signal;

a polarity deciding section operable to detect the polarity decision signal included in the differential transmission signal received by the connector section and to decide, based on a signal level of the polarity decision signal, whether a connecting relationship of the connector section with the transmission lines has a positive polarity or a reversed polarity; and a signal processing section operable to handle the differential transmission signal received by the connector section as a signal having a normal polarity and perform a predetermined process when it is decided that the connecting relationship of the connector section with the transmission lines has the positive polarity, and operable to handle the differential transmission signal received by the connector section as a signal having a reversed polarity and perform the predetermined process when it is decided that the connecting relationship of the connector section with the transmission lines has the reversed polarity.

2. The data transmission system according to claim 1, wherein the differential transmission signal further includes a sync-establishing signal which is transmitted prior to the polarity decision signal and is generated so as to have a signal waveform having a predetermined period, and based on the signal waveform of the sync-establishing signal included in the differential transmission signal received by the connector section, the timing correcting section determines the detection timing for detection of a signal level of a signal received after the sync-establishing signal.

3. The transmission system according to claim 1, wherein the differential transmission signal further includes a transmission data signal which is transmitted after the polarity decision signal and is generated so that a symbol position of data to be transmitted is at a vertex of a waveform, and the timing correcting section is operable to determine whether the detection timing is incorrect or not based on whether a signal detecting position for detection of the signal level in the differential transmission signal in the detection timing is located at the vertex the signal waveform of the differential transmission signal.

4. The data transmission system according to claim 1, wherein the signal processing section includes:

a normal processing section operable to perform a first process on the differential transmission signal received by the connector section when it is decided that the connecting relationship of the connector section with the transmission lines has a positive polarity; and a polarity-reversed processing section operable to perform a second process on the differential transmission signal received by the connector section when it is decided that the connecting relationship of the connector section with the transmission lines has a reversed polarity, and the normal processing section and the polarity-reversed processing section operable to perform the first and second processes, respectively, so that same process results are deduced for the same differential transmission signal being transmitted on the transmission lines.

5. The data transmission system according to claim 1, wherein the signal processing section includes:

a polarity reversing section operable to reverse the polarity of the differential transmission signal received by the connector section when it is decided that the connecting relationship of the connector section with the transmission lines has a reversed polarity; and a normal processing section operable to perform when it is decided that the relationship of the connector section with the transmission lines has a positive polarity, the predetermined process on the differential transmission signal received by the connector section, and operable to perform, when it is decided that the relationship of the connector section with the transmission lines has a reversed polarity, the predetermined process on the differential transmission signal whose polarity has been reversed by the polarity reversing section.

6. The data transmission system according to claim 1, wherein
in the differential transmission signal, data of not less than 1 bit is assigned to each signal level as one symbol.

7. A signal processing circuit operable to receive a differential signal transmitted by using two transmission lines having a polarity via a connector removably connected to the transmission lines and to perform a predetermined process, comprising:
an input terminal arranged to input from the connector a differential transmission signal including a polarity decision signal whose signal level is constant for a length including a predetermined number of pieces of symbol data;
a timing correcting section operable to correct a detection timing when the detecting timing for detecting a signal level at a symbol position in the differential transmission signal, is successively incorrect for a plurality of symbol data whose number is larger than the number of pieces of symbol data representing the polarity decision signal;
a polarity deciding section operable to detect the polarity decision signal included in the differential transmission signal input from the input terminal and operable to decide, based on a signal level of the polarity decision signal, whether a connecting relationship of the connector with the transmission lines has a positive polarity or a reversed polarity; and
a signal processing section operable to handle the differential transmission signal received by the connector as a signal having a normal polarity and perform a predetermined process when it is decided that the connecting relationship of the connector with the transmission lines has the positive polarity, and operable to handle the differential transmission signal received by the connector as a signal having a reversed polarity and perform a predetermined process when it is decided that the connecting relationship of the connector with the transmission lines has the reversed polarity.

8. The signal processing circuit according to claim 7, wherein
the differential transmission signal further includes a sync-establishing signal which is transmitted prior to the polarity decision signal and is generated so as to have a signal waveform having a predetermined period, and
based on the signal waveform of the sync-establishing signal included in the differential transmission signal inputted from the input terminal, the timing correcting section is operable to decide the detection timing for detection of a signal level of a signal received after the sync-establishing signal.

9. The signal processing circuit according to claim 7, wherein
the differential transmission signal further includes a transmission data signal which is transmitted after the polarity decision signal and is generated so that a symbol position of data to be transmitted comes at a vertex of a waveform, and
the timing correcting section is operable to decide whether the detection timing is incorrect or not based on whether a signal detecting position for detection of the signal level in the differential transmission signal in the detection timing is located at the vertex of the signal waveform of the differential transmission signal.

10. The signal processing circuit according to claim 7, wherein
the signal processing section includes:
a normal processing section operable to perform a first process on the differential transmission signal received by the connector when it is decided that the connecting relationship of the connector with the transmission lines has a positive polarity; and
a polarity-reversed processing section operable to perform a second process on the differential transmission signal received by the connector when it is decided that the connecting relationship of the connector with the transmission lines has a reversed polarity, and
the normal processing section and the polarity-reversed processing section operable to perform the first and second processes, respectively, so that same process results are deduced for the same differential transmission signal transmitted on the transmission lines.

11. The signal processing circuit according to claim 7, wherein
the signal processing section includes:
a polarity reversing section operable to reverse the polarity of the differential transmission signal received by the connector when it is decided that the relationship of the connector with the transmission lines has a reversed polarity; and
a normal processing section operable to perform, when it is decided that the relationship of the connector with the transmission lines has a positive polarity, the predetermined process on the differential transmission signal received by the connector, and operable to perform, when it is decided that the relationship of the connector with the transmission lines has a reversed polarity, the predetermined process on the differential transmission signal whose polarity has been reversed by the polarity reversing section.

12. The signal processing circuit according to claim 7, wherein
in the differential transmission signal, data of not less than 1 bit is assigned to each signal level as one symbol.

13. A method of transmitting data between a transmitting device and a receiving device by transmitting a differential signal by using two transmission lines having a polarity, the method comprising,
in the transmitting device, generating a differential transmission signal including a polarity decision signal whose signal level is constant for a length including a predetermined number of pieces of symbol data and sending the differential transmission signal to the transmission lines, and
in the receiving device:
receiving the differential transmission signal transmitted from the transmitting device via a connector removably inserted to the two transmission lines;
correcting a detection timing when the detection timing for detection of a signal level at a symbol position from the differential transmission signal, via the connector, is successively incorrect for a plurality of symbol data whose number is larger than the number of pieces of symbol data representing the polarity decision signal;
detecting the polarity decision signal included in the differential transmission signal received by the connector and, based on a signal level of the polarity decision signal, deciding whether a connecting relationship of the connector with the transmission lines has a positive polarity or a reversed polarity; and handling the differential transmission signal received by the connector as a signal having a normal polarity and performing a predetermined process when it is decided that the connecting relationship of the connector with the transmission lines has the positive polarity, and handling the differential transmission signal received by the connector as a signal having a reversed polarity and performing the predetermined process when it is decided that the connecting relationship of the connector with the transmission lines has the reversed polarity.

* * * * *